(12) United States Patent
Matsushita et al.

(10) Patent No.: US 11,485,326 B2
(45) Date of Patent: Nov. 1, 2022

(54) DEVICE FOR CLEANING IN-VEHICLE SENSOR

(71) Applicant: DENSO CORPORATION, Kariya (JP)

(72) Inventors: Yukihiro Matsushita, Kariya (JP); Eiji Ina, Kariya (JP)

(73) Assignee: DENSO CORPORATION, Kariya (JP)

( * ) Notice: Subject to any disclaimer, the term of this patent is extended or adjusted under 35 U.S.C. 154(b) by 392 days.

(21) Appl. No.: 16/615,774

(22) PCT Filed: Mar. 27, 2018

(86) PCT No.: PCT/JP2018/012374
§ 371 (c)(1),
(2) Date: Nov. 21, 2019

(87) PCT Pub. No.: WO2018/225343
PCT Pub. Date: Dec. 13, 2018

(65) Prior Publication Data
US 2020/0331438 A1    Oct. 22, 2020

(30) Foreign Application Priority Data

Jun. 9, 2017  (JP) .............................. JP2017-114325
Dec. 1, 2017  (JP) .............................. JP2017-231868

(51) Int. Cl.
| G02B 27/00 | (2006.01) |
| B60S 1/54 | (2006.01) |
| F04B 35/04 | (2006.01) |
| B60S 1/52 | (2006.01) |

(52) U.S. Cl.
CPC ................ *B60S 1/54* (2013.01); *F04B 35/04* (2013.01); *G02B 27/0006* (2013.01); *B60S 1/52* (2013.01)

(58) Field of Classification Search
CPC ...... B60S 1/54; B60S 1/56; B60S 1/60; B60S 1/481; B60S 1/52; B60S 1/485; B60S 1/486; F04B 35/04; G02B 27/0006
USPC .............................. 15/3, 404, 405; 239/284.1
See application file for complete search history.

(56) References Cited

U.S. PATENT DOCUMENTS

| 4,632,648 | A | 12/1986 | Goyne |
| 2008/0310977 | A1 | 12/2008 | Moreira et al. |
| 2013/0092758 | A1* | 4/2013 | Tanaka ..................... B60S 1/54 |
| | | | 239/284.1 |
| 2013/0255023 | A1 | 10/2013 | Kikuta et al. |
| 2015/0078940 | A1 | 3/2015 | Kikuta et al. |
| 2016/0348670 | A1 | 12/2016 | Sakohira et al. |
| 2017/0028968 | A1 | 2/2017 | Kubota et al. |

(Continued)

FOREIGN PATENT DOCUMENTS

| JP | S47-16029 B | 5/1972 |
| JP | S51-32428 U | 3/1976 |
| JP | S63-65966 A | 3/1988 |

(Continued)

OTHER PUBLICATIONS

U.S. Appl. No. 16/615,767, filed Nov. 21, 2019 in the name of Yukihiro Matsushita et al.

*Primary Examiner* — Katina N. Henson
(74) *Attorney, Agent, or Firm* — Oliff PLC

(57) ABSTRACT

An on-board sensor cleaning device includes nozzle ports. The on-board sensor cleaning device ejects fluid from the nozzle ports in a predetermined order to clean a sensing surface of an on-board sensor.

10 Claims, 13 Drawing Sheets

(56) References Cited

U.S. PATENT DOCUMENTS

2018/0372078 A1 12/2018 Kawai

FOREIGN PATENT DOCUMENTS

| | | |
|---|---|---|
| JP | 2002-240628 A | 8/2002 |
| JP | 2007-53448 A | 3/2007 |
| JP | 2013-79685 A | 5/2013 |
| WO | 2011/000213 A1 | 1/2011 |

* cited by examiner

DEVICE FOR CLEANING IN-VEHICLE SENSOR

TECHNICAL FIELD

The present disclosure relates to an on-board sensor cleaning device.

BACKGROUND ART

A typical electric pump device drives a piston in a cylinder with driving force of a motor to generate compressed air and discharges the compressed air from a discharge port of the cylinder so that the air is ejected toward a sensing surface (e.g., lens or cover glass) of an on-board sensor such as a camera from a nozzle port that is in communication with the discharge port (for example, refer to patent documents 1 and 2).

A recent vehicle may include multiple on-board sensors such as cameras, and a nozzle port may be arranged for each on-board sensor (for example, refer to patent document 3). In such a case, for example, an electric pump device may be arranged for each on-board sensor (each nozzle port) to eject fluid from the nozzle port.

When the area of a cover glass is relatively large, multiple nozzle ports may be arranged. The fluid may be divided at an upstream side of the nozzle ports and simultaneously ejected from the nozzle ports (for example, refer to patent document 4).

PRIOR ART DOCUMENTS

Patent Documents

Patent Document 1: International Patent Publication No. (WO)2015/159763
Patent Document 2: Japanese Laid-Open Patent Publication No. 2015-83830
Patent Document 3: Japanese Laid-Open Patent Publication No. 2007-53448
Patent Document 4: Japanese Laid-Open Patent Publication No. 2002-240628

SUMMARY OF THE INVENTION

Problems that the Invention is to Solve

However, in a configuration in which an electric pump device is arranged for each nozzle port such as that described above, multiple electric pump devices are necessary. This increases the volume and weight and furthermore increases the costs. Also, in a configuration in which fluid is divided and simultaneously ejected from nozzle ports such as that described above, a single electric pump device may be used. However, the ejection amount per nozzle port is decreased, so that the electric pump device needs to be enlarged. This also increases the volume and weight and furthermore increases the costs.

It is an object of the present disclosure to provide an on-board sensor cleaning device incorporating a size-reduced single electric pump device feeding fluid to nozzle ports.

Means for Solving the Problems

To achieve the above object, an on-board sensor cleaning device includes nozzle ports. The on-board sensor cleaning device ejects fluid from the nozzle ports in a predetermined order to clean a sensing surface of an on-board sensor.

MODES FOR CARRYING OUT THE INVENTION

An embodiment of an on-board sensor cleaning device will now be described below with reference to FIGS. 1 to 14.

Figure 1:
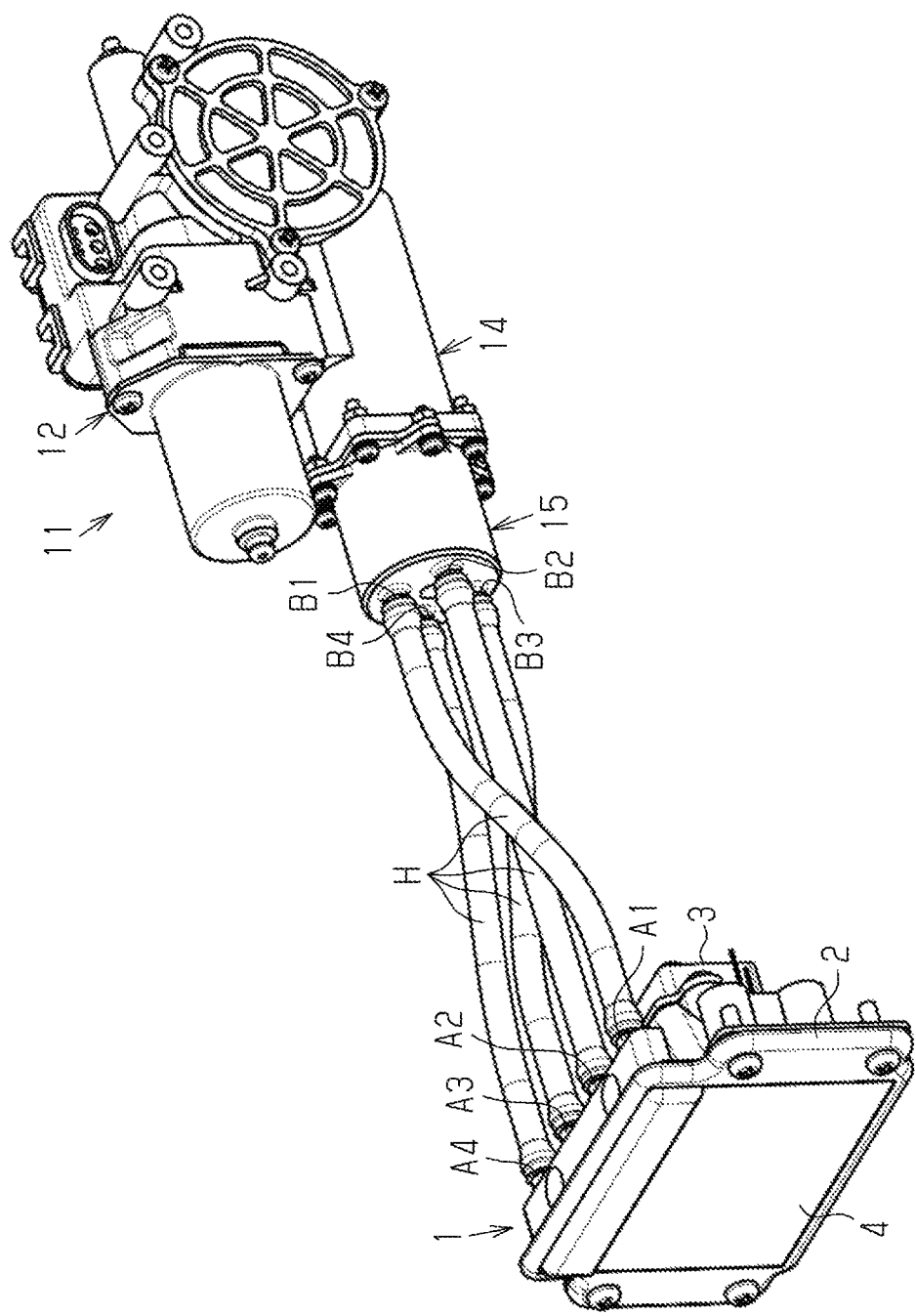
FIG. 1 is a perspective view showing an embodiment of an on-board sensor cleaning device.

As shown in FIG. 1, a camera unit 1 installed on a vehicle includes a casing 2 and an on-board camera 3, which is fixed to the casing 2 and corresponds to an on-board sensor. The casing 2 is fixed to the vehicle. The casing 2 includes a cover glass 4, which is exposed to the exterior of the vehicle and corresponds to a sensing surface. The on-board camera 3 captures an image of the outside of the vehicle through the cover glass 4. In the present embodiment, the cover glass 4 includes a flat outer surface and has the form of a rectangle having horizontal sides that are longer than vertical sides.

Figure 2:
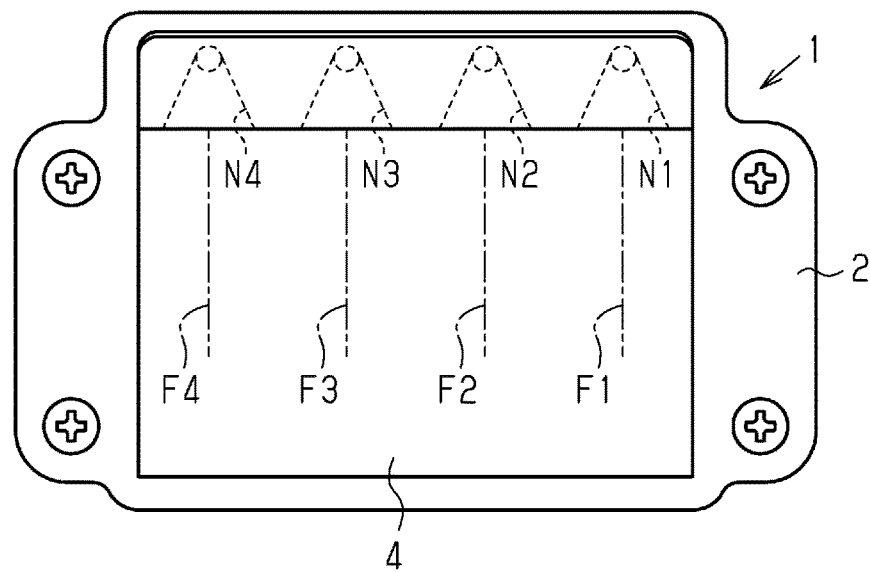
FIG. 2 is a front view of a camera unit shown in FIG. 1.

As shown in FIGS. 1 and 2, the casing 2 includes multiple (first to fourth) inlets A1 to A4 (refer to FIG. 1) and multiple (first to fourth) nozzle ports N1 to N4 (refer to FIG. 2) that are respectively (independently) in communication with the inlets A1 to A4. Each of the nozzle ports N1 to N4 is open so that fluid is ejected toward the cover glass 4. The nozzle ports N1 to N4 are arranged along one side (upper side) located at an antigravitational side of the cover glass 4 so that respective ejection axes F1 to F4 extend in the gravitational direction (are arranged in parallel) as viewed from the front of the cover glass 4. In the present embodiment, the nozzle ports N1 to N4 each have a width that increases toward its open end.

As shown in FIG. 1, the vehicle includes an electric pump device 11. The electric pump device 11 includes a single motor 12, a pump 14 that discharges the fluid from a discharge port 13 (refer to FIG. 4), which will be described later, with driving force of the motor 12, and a flow passage switch 15 including multiple (first to fourth) outlets B1 to B4 configured to be in communication with the discharge port 13. The flow passage switch 15 switches the outlets B1 to B4 that are in communication with the discharge port 13 with driving force of the motor 12. The first to fourth inlets A1 to A4 are in communication with the first to fourth outlets B1 to B4 via respective hoses H. When the electric pump device 11 is driven, the first to fourth nozzle ports N1 to N4 sequentially eject air (compressed air), which corresponds to fluid.

Figure 3:
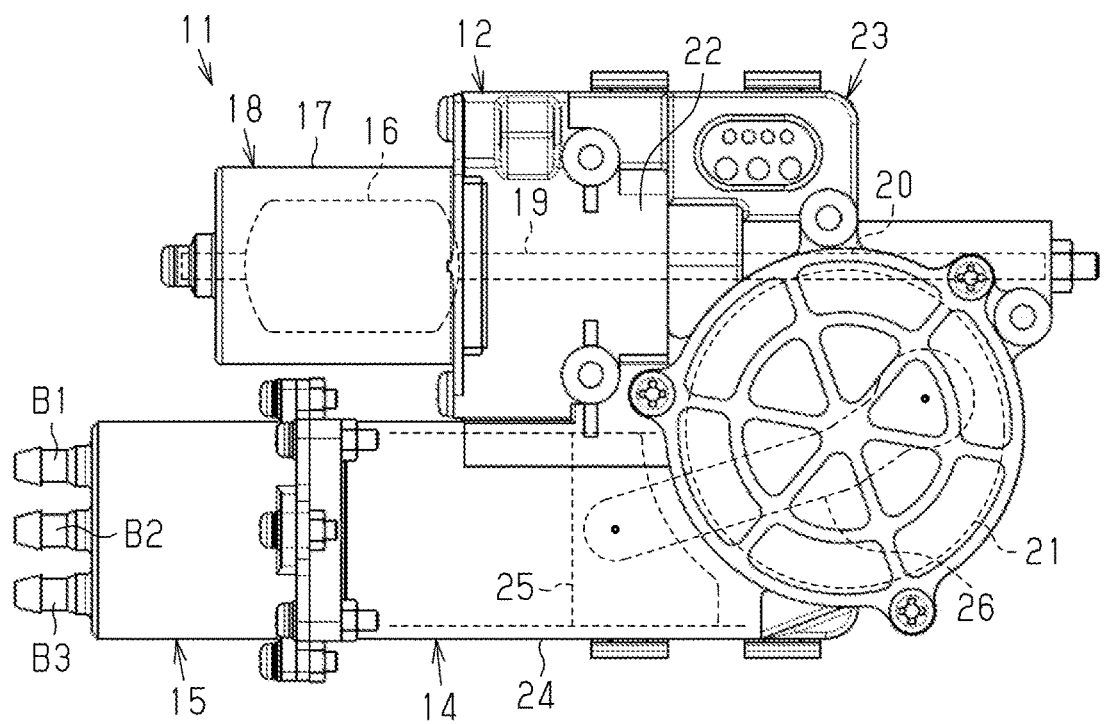
FIG. 3 is a plan view of an electric pump device shown in FIG. 1.

More specifically, as shown in FIG. 3, the motor 12 includes a motor body 18, in which a yoke 17 accommodates an armature 16, and a reduction unit 23, in which a gear housing 22 accommodates a worm 20 that rotates integrally with a rotation shaft 19 of the armature 16 and a worm wheel 21 that engages with the worm 20.

The pump 14 includes a tubular cylinder 24 formed integrally with the gear housing 22 and a piston 25 that reciprocates in the cylinder 24 with driving force of the motor 12. A transmission rod 26 has one end rotationally coupled to the worm wheel 21 on a position deviated from the axial center and the other end rotationally coupled to the piston 25. Thus, when the motor 12 is driven to rotate the worm wheel 21, the piston 25 reciprocates in the axial direction of the cylinder 24.

Figure 4:
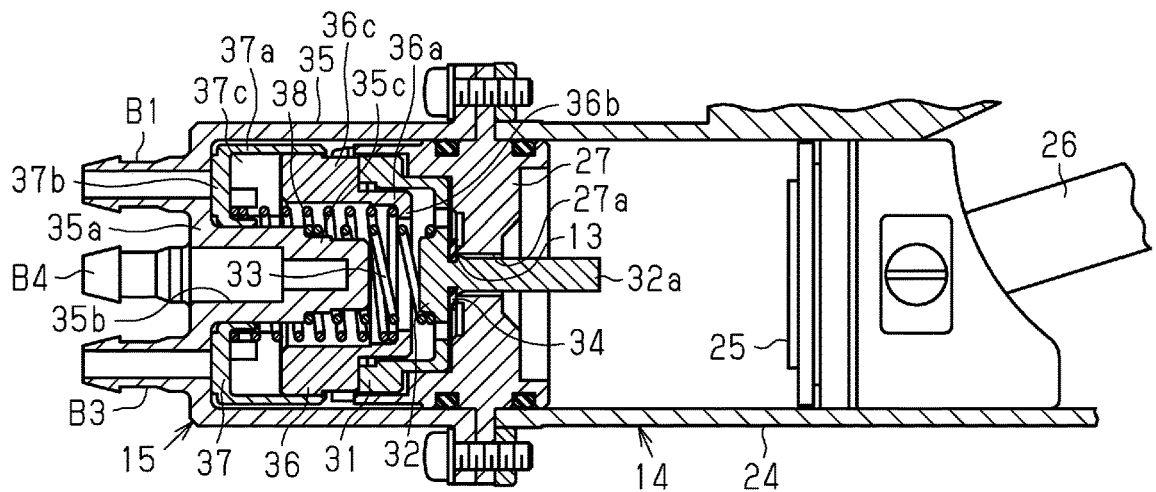
FIG. 4 is a partial cross-sectional view of the electric pump device shown in FIG. 3.
Figure 5:
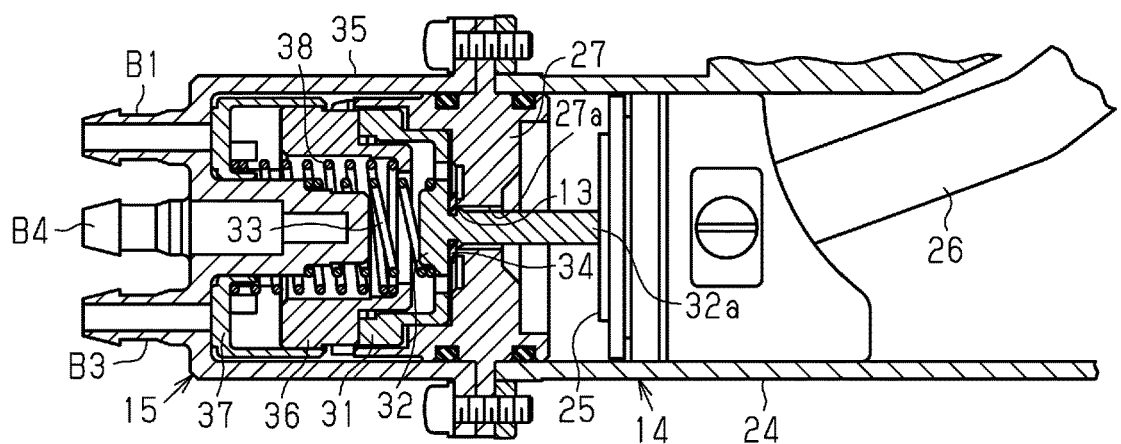
FIG. 5 is a partial cross-sectional view of the electric pump device shown in FIG. 3.
Figure 6:
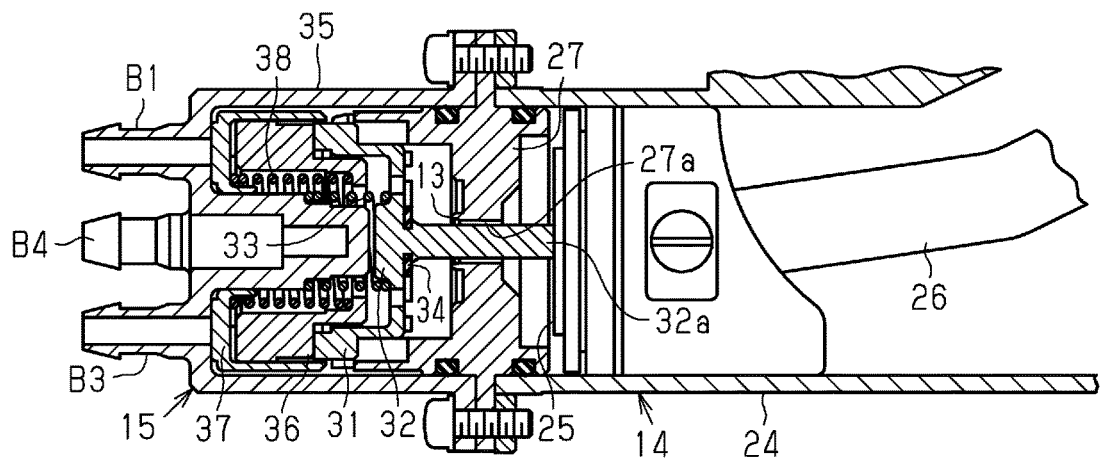
FIG. 6 is a partial cross-sectional view of the electric pump device shown in FIG. 3.

As shown in FIGS. 4 to 6, the cylinder 24 has an end opening to which a cylinder end 27 is fixed. A through hole 27a extends through a central portion of the cylinder end 27. The cylinder outer side end of the through hole 27a defines the discharge port 13. A valve member 32 is formed integrally with a linear movement member 31, which will be described later, and is arranged so that the valve member 32 is urged toward the discharge port 13 by a compression coil spring 33, which corresponds to an urging member and will be described later, and so that a shaft 32a extending from the valve member 32 extends through the through hole 27a (so that distal side projects into the cylinder 24). A rubber seal 34 is attached to a side of the valve member 32 opposed to the discharge port 13 so that the rubber seal 34 is fitted onto the shaft 32a.

Thus, in the pump 14, when the piston 25 is moved forward, the shaft 32a is urged by the piston 25 and the valve member 32 opens against urging force of the compression coil spring 33. Compressed air is discharged from the discharge port 13.

As shown in FIGS. 4 to 7, the flow passage switch 15 includes a tubular case 35 having an end wall and fixed to the outer edge of the cylinder end 27 of the pump 14; the linear movement member 31, a linear movement rotation member 36 and a rotation switch member 37, which are accommodated in the case 35; and compression coil springs 33 and 38 having different diameters. In the present embodiment, the linear movement rotation member 36 and the rotation switch member 37 configure a rotation member. In the present embodiment, a portion of the cylinder end 27 configures a portion of the flow passage switch 15.

Figure 7:
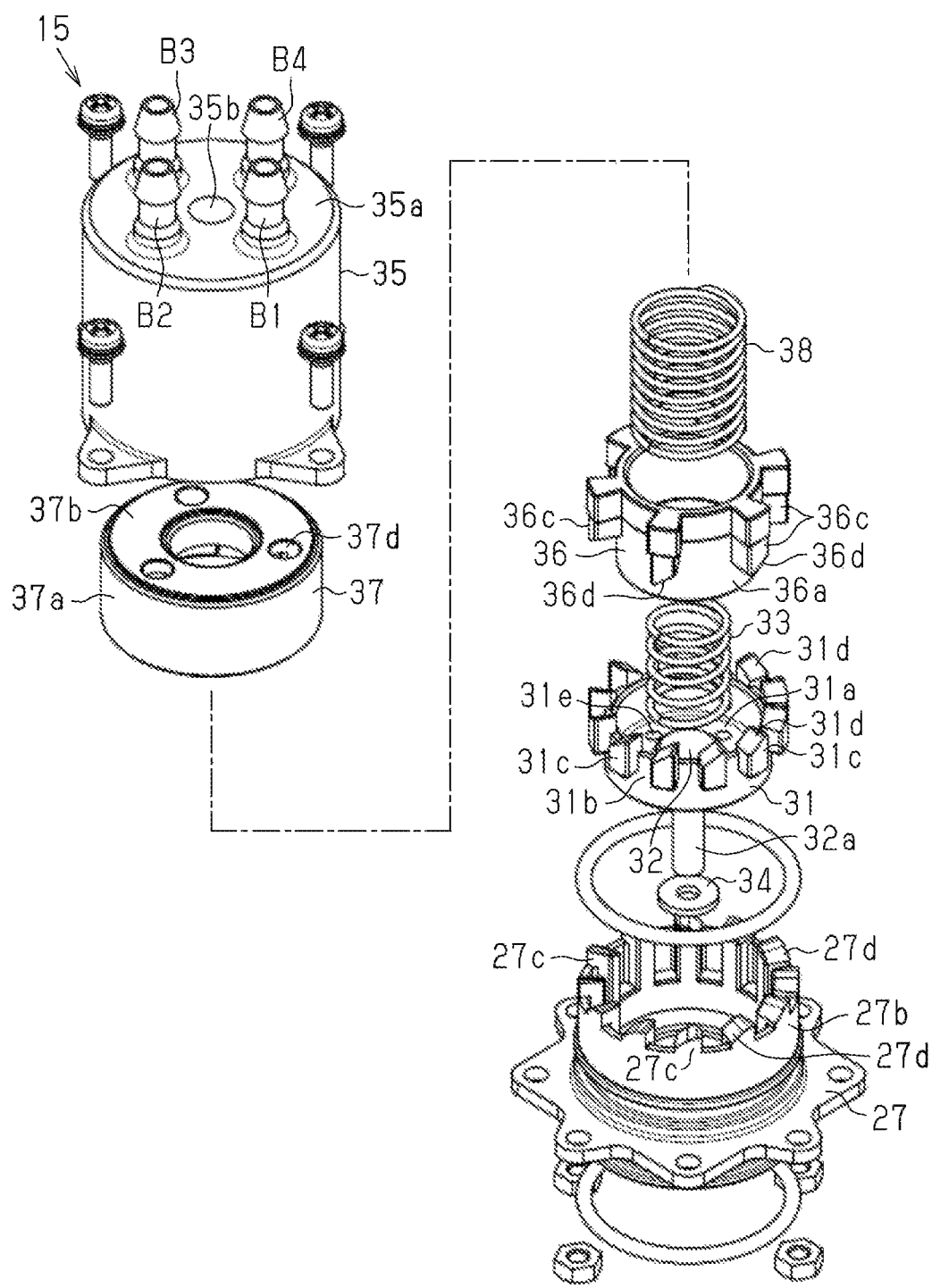
FIG. 7 is an exploded perspective view of a flow passage switch shown in FIG. 1.

More specifically, as shown in FIG. 7, the cylinder end 27 includes a tube 27b fitted into a basal side of the case 35 and multiple fixing projections 27c projecting radially inward from a distal side of the tube 27b and extending in the axial direction. The fixing projections 27c are arranged in the circumferential direction. In the present embodiment, twelve fixing projections 27c are arranged in the circumferential direction at equiangular (30°) intervals. Each of the fixing projections 27c has a distal surface inclined in the circumferential direction (more specifically, as viewed from distal side, the height in the axial direction is reduced at positions toward a clockwise direction side) defining an inclined surface 27d.

The case 35 includes a bottom portion 35a, which is an end opposite to the cylinder end 27. The bottom portion 35a includes the first to fourth outlets B1 to B4 (refer to FIG. 7) arranged at equiangular (90°) intervals. As shown in FIGS. 4 to 6, a cylindrical large diameter tube 35b extends from a central part of the bottom portion 35a toward the cylinder end 27. A cylindrical small diameter tube 35c, which has a reduced diameter and an end wall, extends from the distal end of the large diameter tube 35b further toward the cylinder end 27.

As shown in FIG. 7, the linear movement member 31 includes a disk 31a extending radially outward from the outer edge of the valve member 32, a tube 31b extending from the outer edge of the disk 31a in the axial direction, and multiple linear movement projections 31c projecting radially outward from the distal side of the tube 31b and extending in the axial direction. The linear movement projections 31c are arranged in the circumferential direction. In the present embodiment, twelve linear movement projections 31c are arranged in the circumferential direction at equiangular (30°) intervals. The linear movement projections 31c are located between the fixing projections 27c in the circumferential direction so that the linear movement projections 31c are immovable in the circumferential direction and are movable in the axial direction relative to the fixing projections 27c. Thus, only linear actuation of the linear movement member 31 is allowed. Each of the linear movement projections 31c has a distal surface inclined in the circumferential direction (more specifically, as viewed from distal side, the height in the axial direction is reduced at positions toward a clockwise direction side) defining an inclined surface 31d. The disk 31a includes multiple vent holes 31e through which air passes. As shown in FIG. 4, the compression coil spring 33, which has one end fitted onto the small diameter tube 35c and is supported by the step with the large diameter tube 35b, urges the linear movement member 31 together with the valve member 32 toward the cylinder end 27 (discharge port 13).

The linear movement rotation member 36 includes a tube 36a having a smaller diameter than the tube 31b of the linear movement member 31, an inner extension 36b (refer to FIG. 4) extending radially inward from a basal side of the tube 36a (portion toward the discharge port 13), and multiple linear movement rotation projections 36c projecting radially outward from a distal side of the tube 36a and arranged in the circumferential direction. In the present embodiment, six linear movement rotation projections 36c are arranged in the circumferential direction at equiangular (60°) intervals. Each of the linear movement rotation projections 36c has a basal surface inclined in the circumferential direction (more specifically, inclined along the inclined surface 27d of the fixing projection 27c and the inclined surface 31d of the linear movement projection 31c) defining an inclined surface 36d. The linear movement rotation member 36 is arranged so that a basal portion of the tube 36a is accommodated in the tube 31b of the linear movement member 31 and so that the linear movement rotation projections 36c are contactable with the inclined surfaces 27d of the fixing projections 27c and the inclined surfaces 31d of the linear movement projections 31c in the axial direction. When the linear movement rotation member 36 is located at the side of the discharge port 13, the linear movement rotation projections 36c are configured to be located between the fixing projections 27c in the circumferential direction. In this state, only linear actuation of the linear movement rotation member 36 is allowed. When the linear movement rotation member 36 is located at a side opposite to the discharge port 13, rotary actuation of the linear movement rotation member 36 is also allowed.

The rotation switch member 37 includes a receptacle 37a, which is configured to accommodate a distal portion of the linear movement rotation member 36, and a disk 37b, which extends radially inward from a distal portion of the receptacle 37a and is opposed to the bottom portion 35a of the case 35. The receptacle 37a has an inner surface on which multiple (six) engagement projections 37c (refer to FIG. 4) are arranged in the circumferential direction to engage with the linear movement rotation projections 36c in the circumferential direction. The rotation switch member 37 is rotatable integrally with (non-rotatable relative to) the linear movement rotation member 36 and movable with the linear movement rotation member 36 in a linear actuation direction. The compression coil spring 38 is in a compressed state and located between the disk 37b of the rotation switch member 37 and the inner extension 36b of the linear movement rotation member 36 in the axial direction. Thus, the rotation switch member 37 (disk 37b) is in press contact with the bottom portion 35a of the case 35, and the linear movement rotation member 36 is urged toward the discharge port 13. The disk 37b includes communication holes 37d. The rotation switch member 37 closes (allows communication of) at least one of the first to fourth outlets B1 to B4 to switch the outlets B1 to B4 that are in communication with the discharge port 13 in accordance with the rotation position.

Figure 14:
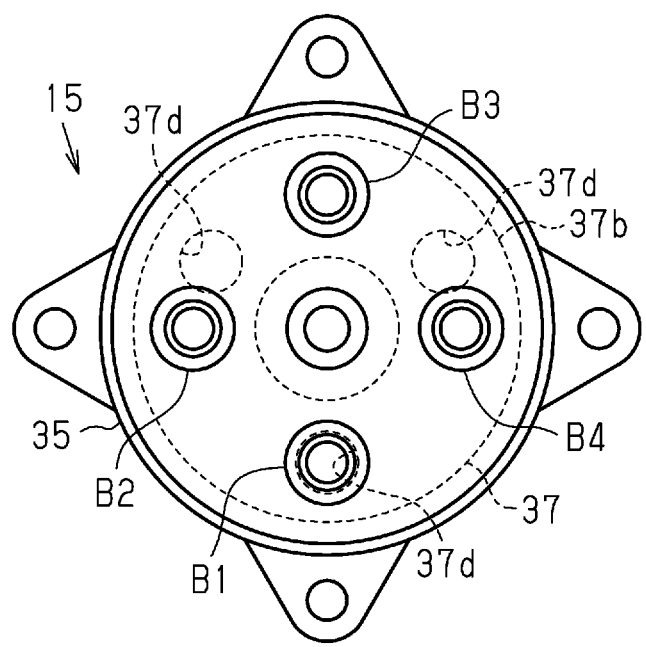
FIG. 14 is a plan view of the flow passage switch shown in FIG. 7.

More specifically, as shown in FIGS. 7 and 14, in the present embodiment, three communication holes 37d are arranged at equiangular (120°) intervals and configured so that with each 30° rotation, a different one of the outlets B1 to B4 is sequentially in communication with the discharge port 13 via one of the communication holes 37d. More specifically, in the state shown in FIG. 14, one of the communication holes 37d is located at a position conforming to the first outlet B1. The first outlet B1 is in communication with the discharge port 13 (refer to FIG. 4) via the communication hole 37d. The remaining second to fourth outlets B2 to B4 are closed by the disk 37b and are not in communication with the discharge port 13. As shown in FIG. 14, before the electric pump device 11 is actuated, one of the communication holes 37d is located at a position that is in communication with one of the outlets B1 to B4.

For example, when the rotation switch member 37 is rotated 30° in the counterclockwise direction from the state shown in FIG. 14, the (upper left in FIG. 14) communication hole 37d is located at a position conforming to the second outlet B2. The second outlet B2 is in communication with the discharge port 13 via the communication hole 37d. When the rotation switch member 37 is further rotated 30° in the counterclockwise direction from this state, the (upper right in FIG. 14) communication hole 37d is located at a position conforming to the third outlet B3. The third outlet B3 is in communication with the discharge port 13 via the communication hole 37d. When the rotation switch member 37 is further rotated 30° in the counterclockwise direction from this state, the (lower in FIG. 14) communication hole 37d is located at a position conforming to the fourth outlet B4. The fourth outlet B4 is in communication with the discharge port 13 via the communication hole 37d. When the rotation switch member 37 is further rotated 30° in the counterclockwise direction from this state, the (upper left in FIG. 14) communication hole 37d is located at a position conforming to the first outlet B1. The first outlet B1 is in communication with the discharge port 13 via the communication hole 37d. Such a repetition allows the outlets B1 to B4 to be sequentially in communication with the discharge port 13 via the communication holes 37d. In the present embodiment, the inclination direction of the inclined surfaces 27d, 31d, and 36d is illustrated in the reverse direction and does not correspond to the rotation direction of the rotation switch member 37 described above.

The operation of the above-described on-board sensor cleaning device will now be described.

Figure 8:
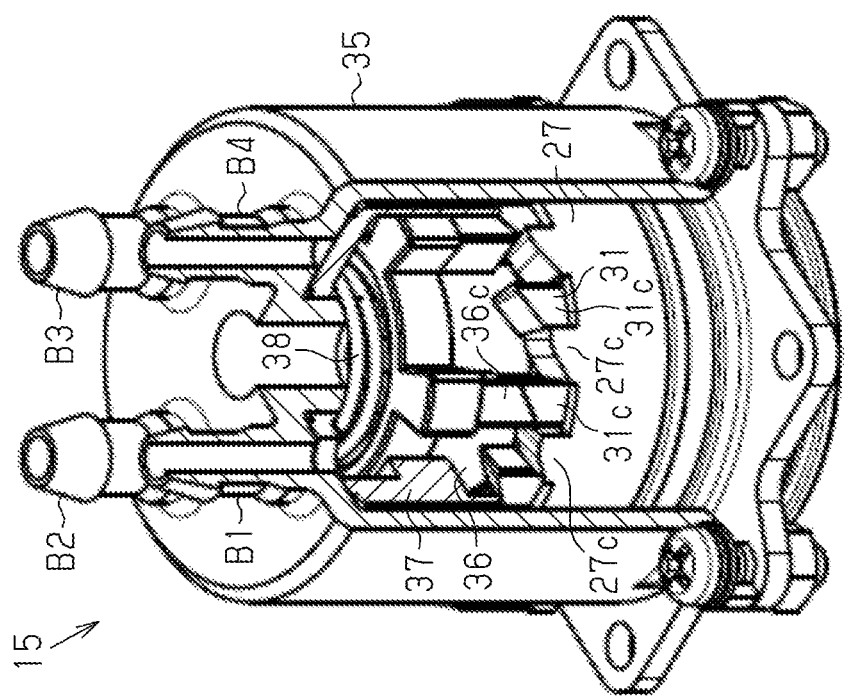
FIG. 8 is a partial cross-sectional perspective view of the flow passage switch shown in FIG. 7.

As shown in FIGS. 4 and 8, when the piston 25 is located at the bottom dead position (position farthest from the cylinder end 27), the linear movement member 31 is located at the side of the cylinder end 27, and the discharge port 13 is closed by the valve member 32. In this state, the linear movement projections 31c of the linear movement member 31 are embedded between the fixing projections 27c, and the linear movement rotation projections 36c of the linear movement rotation member 36 are fitted between the fixing projections 27c. Thus, circumferential movement (rotation) of the linear movement rotation member 36 and the rotation switch member 37 is restricted.

As shown in FIG. 5, when the motor 12 is driven to move the piston 25 forward, the air in the cylinder 24 is compressed until the piston 25 comes into contact with the shaft 32a of the linear movement member 31.

When the piston 25 is further moved forward, the piston 25 urges the shaft 32a. When the linear movement member 31 including the valve member 32 is slightly actuated linearly toward the distal side (toward the bottom portion 35a of the case 35) against urging force of the compression coil spring 33, the valve member 32 opens to discharge the compressed air from the discharge port 13. At this time, the air is ejected from, for example, the first outlet B1 located at a position conforming to the communication hole 37d and in communication with the discharge port 13. The air is fed to the first inlet A1 through the hose H (refer to FIG. 1) and ejected from the first nozzle port N1 (refer to FIG. 2) toward the cover glass 4. At this time, the linear movement rotation projections 36c are urged by the linear movement projections 31c, so that the linear movement rotation member 36 is also slightly actuated linearly toward the distal side (toward the bottom portion 35a of the case 35) against urging force of the compression coil spring 38.

Figure 9:
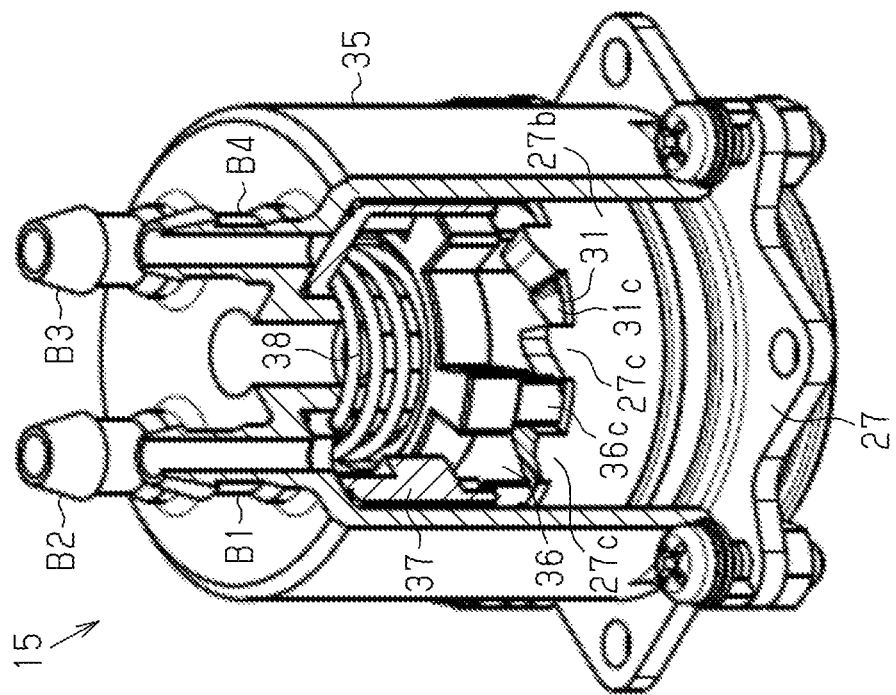
FIG. 9 is a partial cross-sectional perspective view of the flow passage switch shown in FIG. 7.

As shown in FIG. 9, when forward movement of the piston 25 linearly actuates the linear movement member 31 (linear movement projections 31c) further toward the distal side, the linear movement rotation member 36 is also linearly actuated toward the distal side (toward the bottom portion 35a of the case 35) to a predetermined position where the linear movement rotation projections 36c become out of contact with the fixing projections 27c in the circumferential direction.

Figure 10:
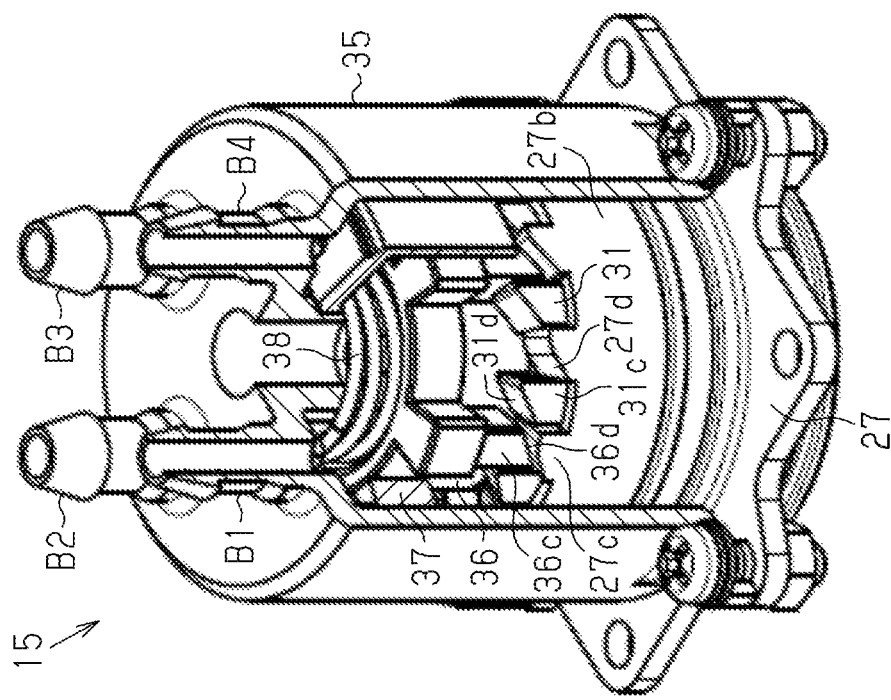
FIG. 10 is a partial cross-sectional perspective view of the flow passage switch shown in FIG. 7.

As shown in FIGS. 6 and 10, when forward movement of the piston 25 linearly actuates the linear movement member 31 (linear movement projections 31c) further toward the distal side, the linear movement rotation projections 36c moves beyond the predetermined position and becomes out of contact with the fixing projections 27c in the circumferential direction. The inclined surfaces 31d and 36d convert the linear actuation into rotary actuation, and the linear movement rotation member 36 and the rotation switch member 37 are rotated.

Figure 11:
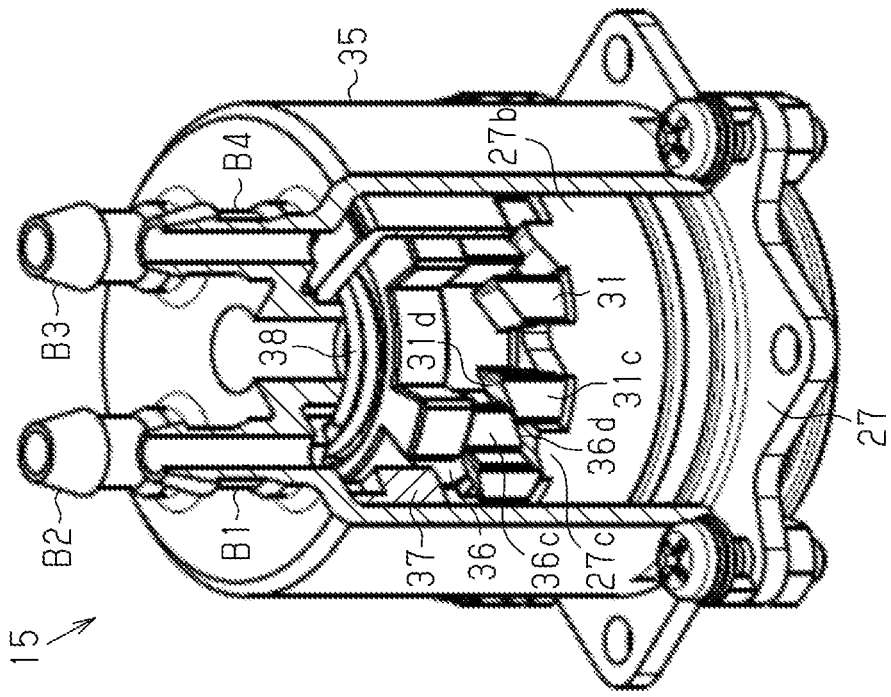
FIG. 11 is a partial cross-sectional perspective view of the flow passage switch shown in FIG. 7.

Consequently, as shown in FIG. 11, the fixing projections 27c of the linear movement rotation member 36 and the linear movement rotation projections 36c are aligned in the axial direction (circumferential positions conform to each other).

Figure 12:
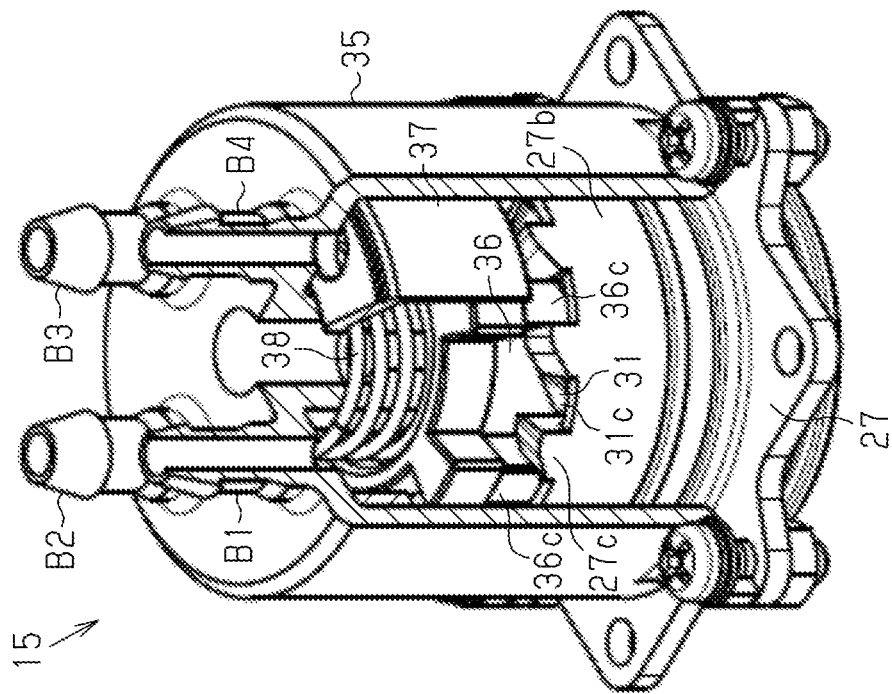
FIG. 12 is a partial cross-sectional perspective view of the flow passage switch shown in FIG. 7.

As shown in FIG. 12, when the piston 25 is moved backward and the linear movement projections 31c of the linear movement member 31 are embedded between the fixing projections 27c, the inclined surfaces 27d and 36d convert linear actuation caused by the compression coil spring 38 into rotary actuation. The linear movement rotation member 36 and the rotation switch member 37 are further rotated.

Figure 13:
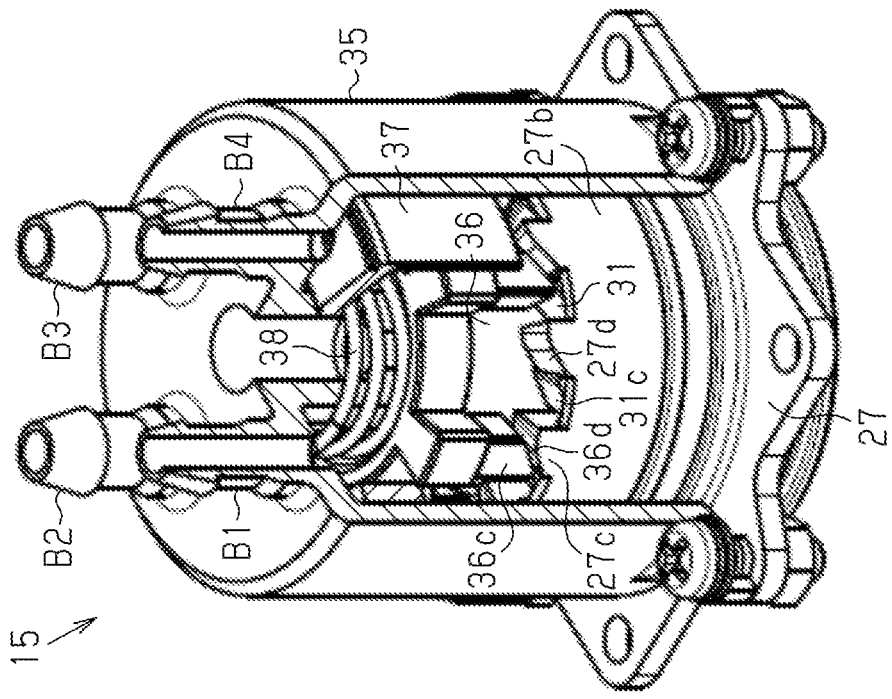
FIG. 13 is a partial cross-sectional perspective view of the flow passage switch shown in FIG. 7.

As shown in FIG. 13, the linear movement rotation projections 36c of the linear movement rotation member 36 are fitted between the fixing projections 27c located next to the initial ones (refer to FIG. 8). Thus, circumferential movement (rotation) of the linear movement rotation member 36 and the rotation switch member 37 is restricted. At this time, for example, one of the communication holes 37d is located at a position conforming to the second outlet B2. When the valve opens next time, the air is ejected from the second outlet B2, which is in communication with the discharge port 13.

Repetition of such actuations sequentially ejects the air from the first to fourth nozzle ports N1 to N4 in a predetermined order. In the present embodiment, the predetermined order refers to an order that repeats a pattern in which the nozzle ports N1 to N4 are selected one at a time and the nozzle ports N1 to N4 are each selected once. The pattern proceeds one by one from a side of one end (in FIG. 2, right side, first nozzle port N1) toward a side of the other end (in FIG. 2, left side, fourth nozzle port N4) in the arrangement direction.

The embodiment has the advantages described below.

(1) The first to fourth nozzle ports N1 to N4 are configured to eject air in a predetermined order to clean the cover glass 4 of the on-board camera 3. This allows for reduction in size while using the single electric pump device 11 to feed air to the nozzle ports N1 to N4.

(2) The predetermined order refers to an order that repeats a pattern in which the nozzle ports N1 to N4 are selected one at a time and the nozzle ports N1 to N4 are each selected once. Thus, the air (fluid) is sequentially ejected from the nozzle ports N1 to N4. That is, the amount of ejection from the nozzle ports N1 to N4 is increased. When the nozzle ports N1 to N4 are each selected once in a pattern, the cover glass 4 is evenly cleaned by the air sequentially ejected from each of the nozzle ports N1 to N4. The pattern proceeds one by one from the side of one end toward the side of the other end in the arrangement direction of the first to fourth nozzle ports N1 to N4. Thus, the cover glass 4 is evenly cleaned from the side of one end toward the side of the other end in the arrangement direction in a sequential manner.

(3) The first to fourth nozzle ports N1 to N4 are open toward the single cover glass 4. The ejection axes F1 to F4 of air ejected from the nozzle ports N1 to N4 are set to non-coaxial directions. Thus, a wide range of the cover glass 4 is cleaned in a satisfactory manner.

(4) Since the first to fourth nozzle ports N1 to N4 are located at an antigravitational side of the cover glass 4, the air is ejected in the gravitational direction. Thus, the cover glass 4 is cleaned in a satisfactory manner as compared to a case in which air is ejected against gravity.

(5) The electric pump device 11 includes the pump 14 that discharges fluid (air) from the discharge port 13 with driving force of the motor 12 and the flow passage switch 15 that includes the first to fourth outlets B1 to B4 configured to be in communication with the discharge port 13 and switches the outlets B1 to B4 that are in communication with the discharge port 13 with driving force of the motor 12. Thus, while the fluid is discharged from the discharge port 13 of the pump 14 with driving force of the single motor 12, the flow passage switch 15 switches the outlets B1 to B4 that are in communication with the discharge port 13 with driving force of the same motor 12. The configuration including the single motor 12 allows the fluid (air) to be sequentially fed from the outlets B1 to B4. For example, as described in the present embodiment, the air is sequentially ejected from the nozzle ports N1 to N4. More specifically, this configuration reduces the number of electric pump devices 11 as compared to, for example, a configuration in which an electric pump device (motor and pump) is provided for each of the nozzle ports N1 to N4 and the size of the electric pump device 11 can be reduced as compared to a configuration that divides air. Thus, while being reduced in size, the fluid (air) is fed to multiple locations in a satisfactory manner.

(6) The linear movement member 31 is urged and actuated in one direction by driving force of the motor 12 and in the other direction by urging force of the compression coil spring 33. In such a configuration, driving force of the motor 12 needs to be transmitted in only one direction. This simplifies the configuration that drivingly couples the motor 12 to the linear movement member 31. More specifically, as in the present embodiment, the configuration may be simplified so that the linear movement member 31 needs to be urged only when moving the piston 25 forward.

(7) The linear movement member 31 is urged and actuated by the piston 25 of the pump 14. Thus, the piston 25 of the pump 14 also functions as a mechanism (mechanism that discharges air) that urges the linear movement member 31 in one direction. This simplifies the configuration as compared to, for example, a configuration having a separate mechanism that urges the linear movement member 31.

(8) Feeding of fluid from the discharge port 13 of the pump 14 to the outlets B1 to B4 is set to be completed in a state before the linear movement rotation member 36 and the rotation switch member 37 are rotated in the circumferential direction by linear actuation of the linear movement member 31. Thus, feeding of air from the outlets B1 to B4 is completed before the outlets B1 to B4 that are in communication with the discharge port 13 are switched. More specifically, the air will not be ejected while switching the outlets B1 to B4.

(9) When the number of the outlets B1 to B4 is the same as the number of the nozzle ports N1 to N4, the nozzle ports N1 to N4 evenly clean the corresponding cover glass 4.

The above-described embodiment may be modified as follows.

In the embodiment, the nozzle ports N1 to N4 are set so that the ejection axes F1 to F4 extend in the gravitational direction as viewed from the front of the cover glass 4. Instead, the nozzle ports N1 to N4 may be set so that the ejection axes F1 to F4 are inclined from the gravitational direction as viewed from the front of the cover glass 4.

Figure 15:
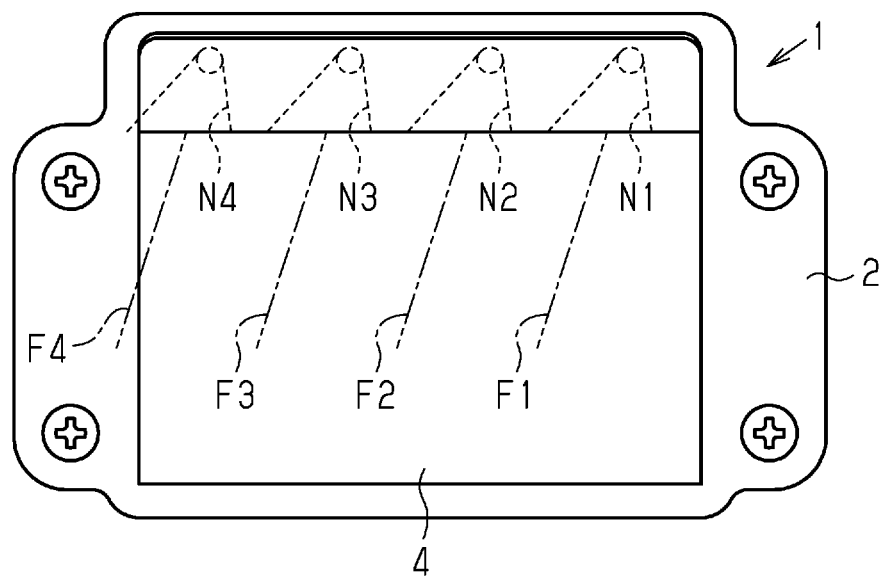
FIG. 15 is a front view showing a further example of a camera unit.

For example, as shown in FIG. 15, the nozzle ports N1 to N4 may be changed so that the ejection axes F1 to F4 are inclined toward the other end in the arrangement direction (in FIG. 15, sideward direction). With such a configuration, smearing on the cover glass 4 is sequentially moved toward the other end in the arrangement direction, and the cover glass 4 is cleaned in a satisfactory manner.

In the embodiment, the first to fourth nozzle ports N1 to N4 are located at the antigravitational side of the cover glass 4. Instead, the first to fourth nozzle ports N1 to N4 may be located at the gravitational side of the cover glass 4 so that the ejection axes extend in the antigravitational direction.

The embodiment is configured to include the first to fourth nozzle ports N1 to N4 (outlets B1 to B4). Instead, the number of nozzle ports may be changed to any plural number.

Figure 16:
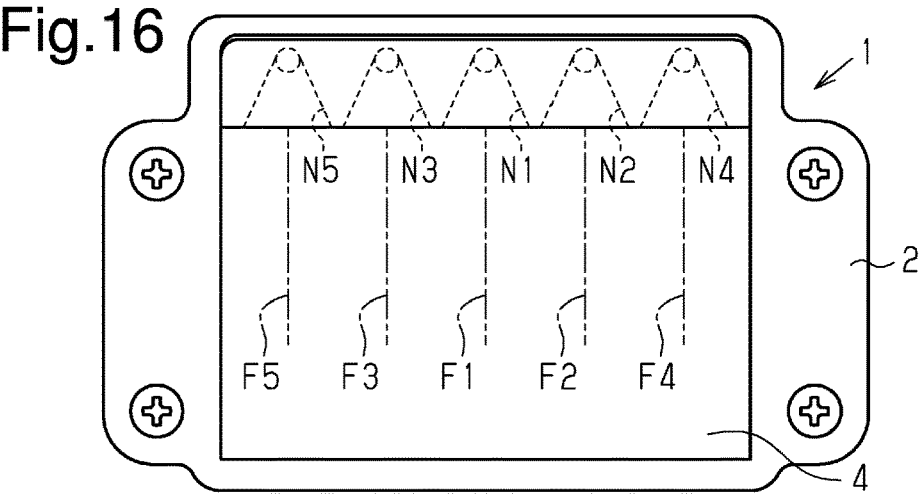
FIG. 16 is a front view showing a further example of a camera unit.

For example, as shown in FIG. 16, the configuration may include first to fifth nozzle ports N1 to N5. In this example, the pattern of the order of air ejection starts from a central position in the arrangement direction of the nozzle ports N1 to N5 and alternately switches between the side of one end and the side of the other end in the arrangement direction to proceed toward the ends in the arrangement direction. With such a configuration, the cover glass 4 is evenly cleaned from the central position toward the opposite ends in the arrangement direction in a sequential manner.

Figure 17:
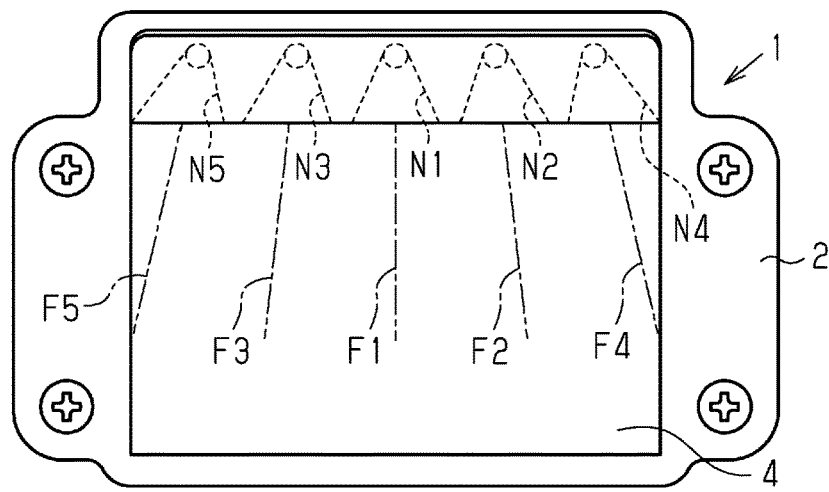
FIG. 17 is a front view showing a further example of a camera unit.

The setting of the ejection axes F1 to F5 of the first to fifth nozzles N1 to N5 in the above further example (refer to FIG. 16) may be changed as shown in FIG. 17. More specifically, in this example (refer to FIG. 17), the ejection axis F1 of the first nozzle port N1 located in the central position in the arrangement direction is not inclined in the arrangement direction. The ejection axes F2 and F4 of the second and fourth nozzle ports N2 and N4, which are located at the side of one end in the arrangement direction, are inclined toward the one end in the arrangement direction. The ejection axes F3 and F5 of the third and fifth nozzle ports N3 and N5, which are located at the side of the other end in the arrangement direction, are inclined toward the other end in the arrangement direction. With such a configuration, smearing on the cover glass 4 is sequentially moved from the central position toward the opposite ends in the arrangement direction, and the cover glass 4 is cleaned in a satisfactory manner.

Figure 18:
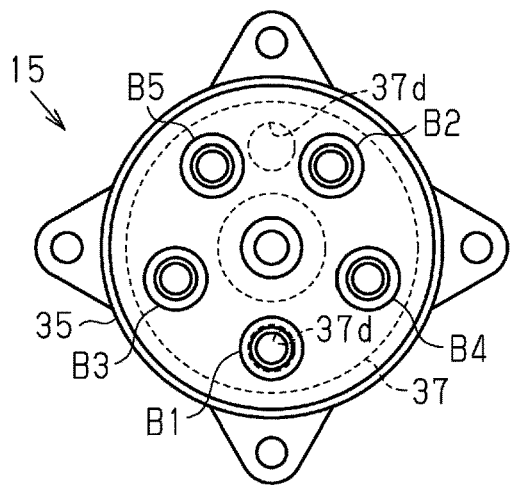
FIG. 18 is a plan view showing a further example of a flow passage switch.

When the five nozzle ports N1 to N5 are included as in the further examples (refer to FIGS. 16 and 17), the flow passage switch 15 needs to include first to fifth outlets B1 to B5 as shown in FIG. 18. More specifically, in this example (refer to FIG. 18), the flow passage switch 15 includes first to fifth outlets B1 to B5 at equiangular (72°) intervals. Two communication holes 37d are formed in the rotation switch member 37 at equiangular (180°) intervals and configured so that whenever the rotation switch member 37 is rotated 36°, a different one of the outlets B1 to B5 is sequentially in communication with one of the communication holes 37d. FIG. 18 shows a state in which the first outlet B1 is in communication with the communication hole 37d. Whenever the rotation switch member 37 is rotated 36° in the clockwise direction from the present state, the second to fifth outlets B2 to B5 are sequentially in communication with the communication holes 37d. In the present example, in the same manner as the embodiment, before the electric pump device 11 is actuated, one of the communication holes 37d is located at a position that is in communication with one of the outlets B1 to B5.

The number of outlets (nozzle ports) and the pattern of the order of air ejection may be changed, for example, as shown in FIGS. 19A to 19F. In the configurations shown in FIGS. 19A to 19F, in the same manner as the embodiment, before the electric pump device 11 is actuated, at least one of the communication holes 37d is located at a position that is in communication with one of the outlets.

Figure 19A:
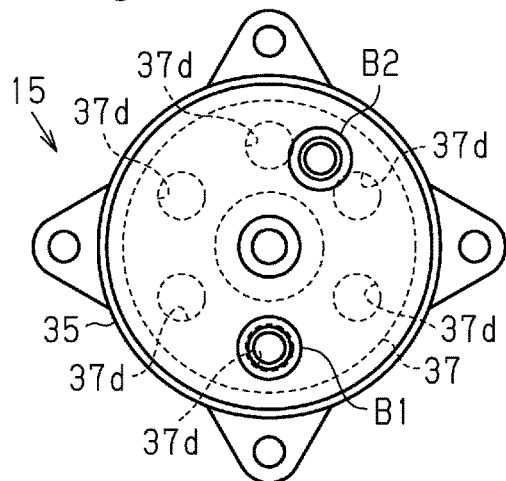
FIGS. 19A to 19F are plan views showing further examples of a flow passage switch.

More specifically, as shown in FIG. 19A, the flow passage switch 15 may include first and second outlets B1 and B2 separated from each other by 150°, and six communication holes 37d may be formed in the rotation switch member 37 at equiangular (60°) intervals so that whenever the rotation switch member 37 is rotated 30°, a different one of the outlets B1 and B2 is sequentially in communication with one of the communication holes 37d.

Figure 19B:
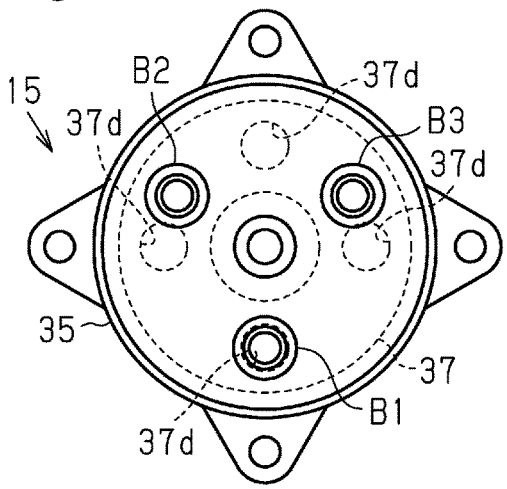

As shown in FIG. 19B, the flow passage switch 15 may include first to third outlets B1 to B3 at equiangular (120°) intervals, and four communication holes 37d may be formed in the rotation switch member 37 at equiangular (90°) intervals so that whenever the rotation switch member 37 is rotated 30°, a different one of the outlets B1 to B3 is sequentially in communication with one of the communication holes 37d.

Figure 19C:
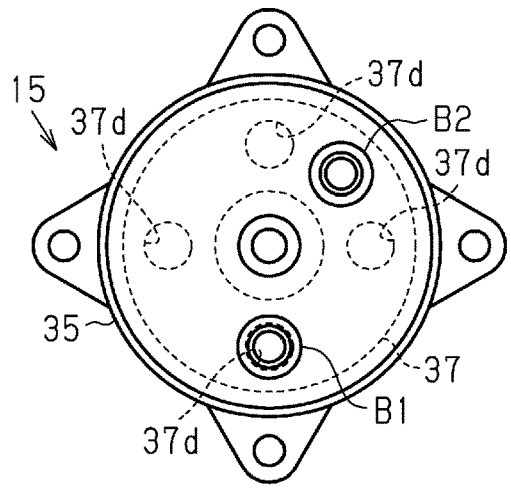

As shown in FIG. 19C, the flow passage switch 15 may include first and second outlets B1 and B2 separated from each other by 135°, and four communication holes 37d may be formed in the rotation switch member 37 at equiangular (90°) intervals so that whenever the rotation switch member 37 is rotated 45°, a different one of the outlets B1 and B2 is sequentially in communication with one of the communication holes 37d.

Figure 19D:
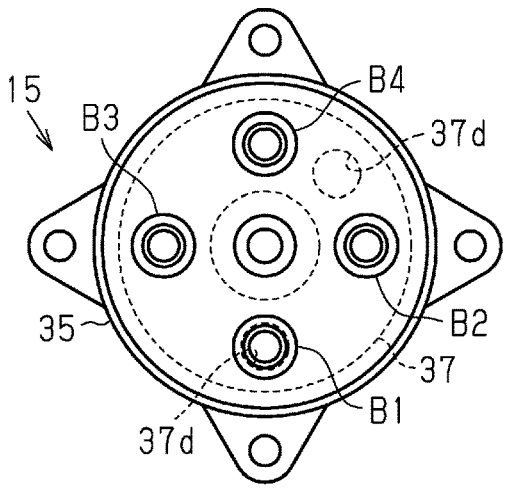

As shown in FIG. 19D, the flow passage switch 15 may include first to fourth outlets B1 to B4 at equiangular (90°) intervals, and two communication holes 37d may be formed in the rotation switch member 37 and separated from each other by 135° so that whenever the rotation switch member 37 is rotated 45°, a different one of the outlets B1 to B4 is sequentially in communication with one of the communication holes 37d. This example does not repeat a pattern in which the outlets B1 to B4 (nozzle ports) that are in communication with the communication holes 37d are each selected once. More specifically, as the rotation switch member 37 is rotated 45° in the clockwise direction from the state shown in FIG. 19D, communication with the communication holes 37d is established in order of the first outlet B1, the second outlet B2, the third outlet B3, the first outlet B1, the fourth outlet B4, the third outlet B3, the second outlet B2, the fourth outlet B4, and so on.

Figure 19E:
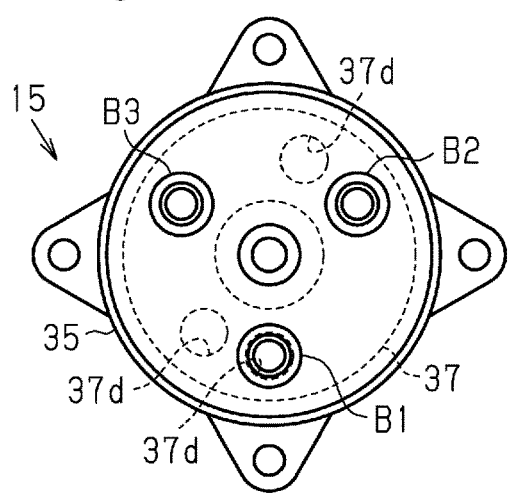

As shown in FIG. 19E, the flow passage switch 15 may include first to third outlets B1 to B3 located at equiangular (120°) intervals, and the rotation switch member 37 may include three communication holes 37d, namely, a reference communication hole 37d, a communication hole 37d separated by 40° from the reference communication hole 37d in the clockwise direction, and a communication hole 37d separated by 160° from the reference communication hole 37d in the counterclockwise direction. Whenever the rotation switch member 37 is rotated 40°, a different one of the outlets B1 to B3 is sequentially in communication with one of the communication holes 37d. This example does not repeat a pattern in which the outlets B1 to B3 (nozzle ports) that are in communication with the communication holes 37d are each selected once. More specifically, as the rotation switch member 37 is rotated 40° in the clockwise direction from the state shown in FIG. 19E, communication with the communication holes 37d is established in order of the first outlet B1, the second outlet B2, the third outlet B3, the third outlet B3, the first outlet B1, the second outlet B2, the second outlet B2, the third outlet B3, the first outlet B1, and so on.

Figure 19F:
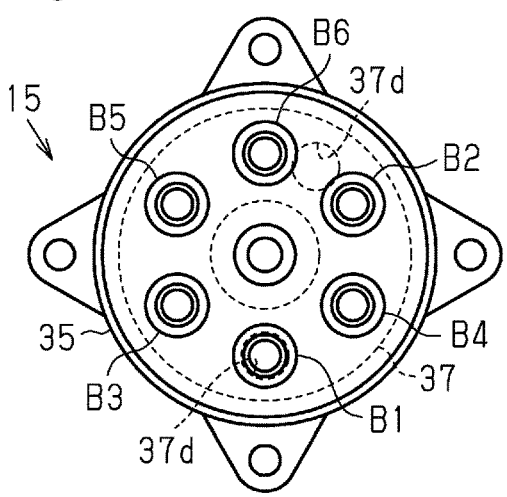

As shown in FIG. 19F, the flow passage switch 15 may include first to sixth outlets B1 to B6 at equiangular (60°) intervals, and two communication holes 37d may be formed in the rotation switch member 37 and separated from each other by 150° so that whenever the rotation switch member 37 is rotated by 30°, a different one of the outlets B1 to B6 is sequentially in communication with one of the communication holes 37d. This example does not repeat a pattern in which the outlets B1 to B6 (nozzle ports) that are in communication with the communication holes 37d are each selected once. More specifically, as the rotation switch member 37 is rotated 30° in the clockwise direction from the state shown in FIG. 19F, communication with the communication holes 37d is established in order of the first outlet B1, the second outlet B2, the third outlet B3, the fourth outlet B4, the fifth outlet B5, the first outlet B1, the sixth outlet B6, the third outlet B3, the second outlet B2, the fifth outlet B5, the fourth outlet B4, the sixth outlet B6, and so on.

In the embodiment, the electric pump device 11 is configured so that the motor 12, the pump 14, and the flow passage switch 15 are arranged integrally with each other. Instead, the motor 12, the pump 14, and the flow passage switch 15 may be configured not to be integrally arranged (may be arranged in different casings).

Figure 20:
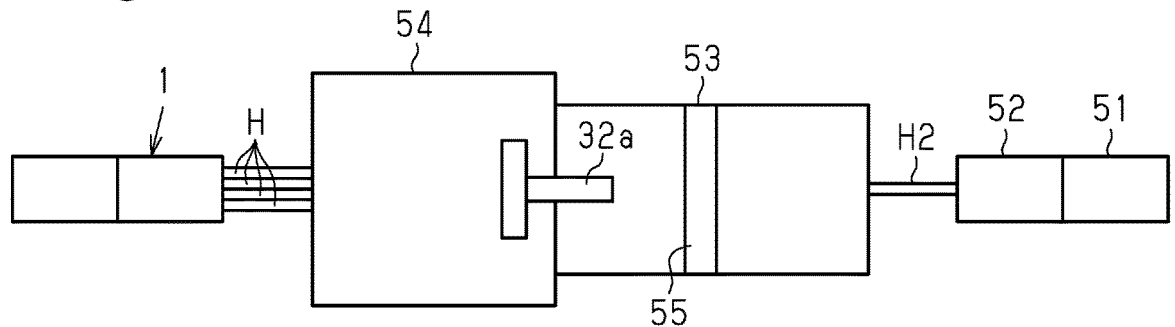
FIG. 20 is a schematic view showing the configuration of a further example of an on-board sensor cleaning device.

For example, as shown in FIG. 20, when a motor 51 and a first pump 52 are arranged integrally with each other and a second pump 53 and a flow passage switch 54 are arranged integrally with each other, they may be connected by a hose H2. In this example, for example, the first pump 52 is a centrifugal pump, and the second pump 53 is of a cylinder type and includes a piston 55 driven by air from the first pump 52.

The configuration of the flow passage switch 15 of the embodiment may be changed to another configuration that includes multiple outlets configured to be in communication with a discharge port of a pump and switches the outlet that is in communication with the discharge port with driving force of a motor that drives the pump.

In the embodiment, the linear movement member 31 is configured to be urged and actuated by driving force of the motor 12 in one direction and urged and actuated by urging force of the compression coil spring 33 in the other direction. Instead, for example, the linear movement member 31 may be configured to be actuated by driving force of a motor in one direction and the other direction.

In the embodiment, the linear movement member 31 is configured to be urged and actuated by the piston 25 of the pump 14. Instead, for example, the configuration may include a separate mechanism that urges the linear movement member 31 with driving force of the motor 12.

In the embodiment, the first to fourth nozzle ports N1 to N4 are configured to eject air toward the single cover glass 4. Instead, the first to fourth nozzle ports N1 to N4 may eject air toward multiple sensing surfaces (e.g., cover glass, lens).

The on-board sensor cleaning device may be configured to perform cleaning by ejecting fluid such as cleaning liquid instead of air.

Figure 21:
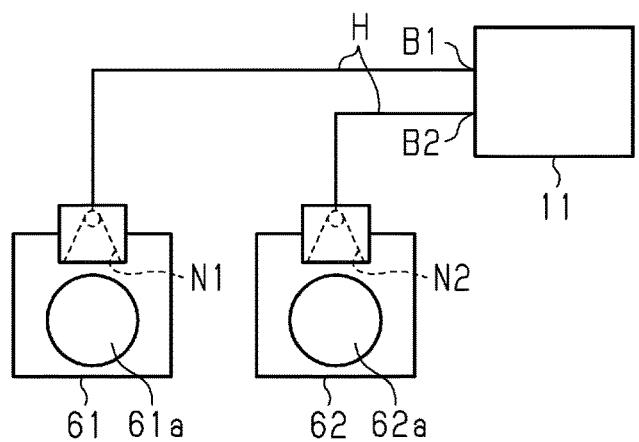
FIG. 21 is a schematic view showing a further example of an on-board sensor cleaning device.

For example, a modification may be configured as shown in FIG. 21. More specifically, the electric pump device 11 may include first and second outlets B1 and B2 (refer to FIG. 19C). The first and second nozzle ports N1 and N2, which are in communication with the first and second outlets B1 and B2, may eject air toward lenses 61a and 62a, which correspond to sensing surfaces of two on-board cameras 61 and 62. With such a configuration, the lenses 61a and 62a are sequentially cleaned in a satisfactory manner.

Figure 22:
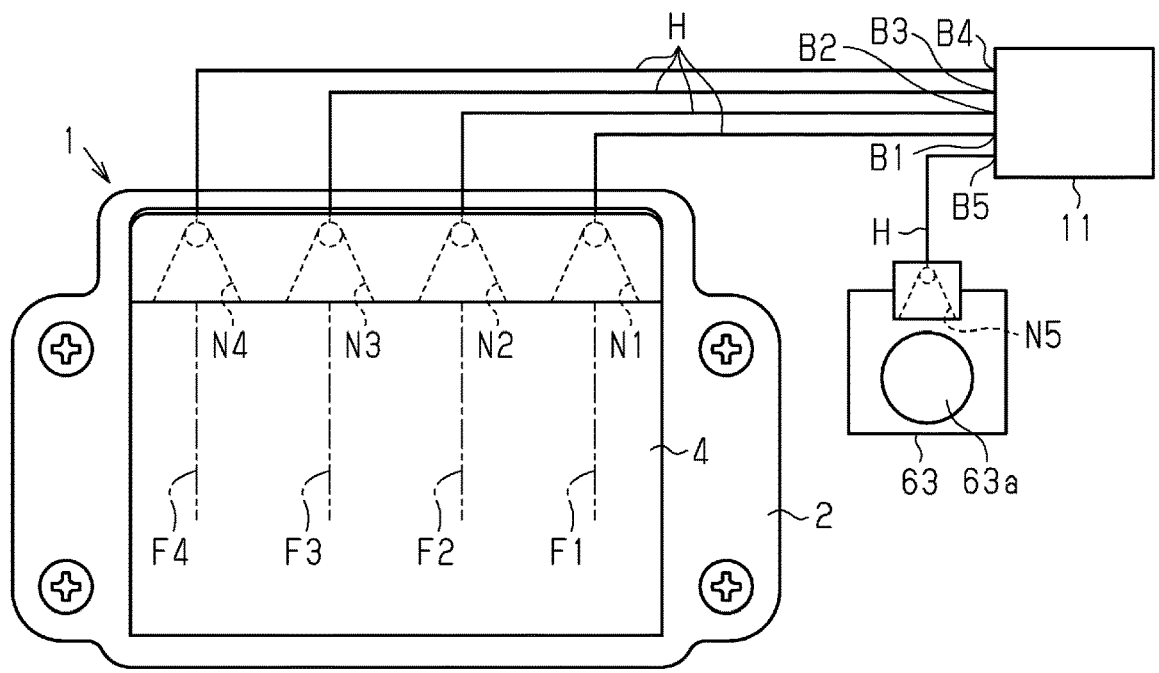
FIG. 22 is a schematic view showing a further example of an on-board sensor cleaning device.

For example, a modification may be configured as shown in FIG. 22. More specifically, the electric pump device 11 may include first to fifth outlets B1 to B5 (refer to FIG. 18). The first to fourth nozzle ports N1 to N4, which are in communication with the first to fourth outlets B1 to B4, may be the same as the embodiment (are configured to eject air toward the single cover glass 4). The fifth nozzle port N5, which is in communication with the fifth outlet B5, may eject air toward a lens 63a of a separate on-board camera 63. With such a configuration, the cover glass 4 and the lens 63a are sequentially cleaned in a satisfactory manner.

In the embodiment, the outer surface of the cover glass 4 is flat. Instead, for example, the outer surface may be curved defining a curved surface.

In the embodiment, although not particularly described, ejection of air from all of the nozzle ports N1 to N4 may be defined as a cycle, and when stopping, the actuation may be continued until the cycle is completed. More specifically, for example, a controller that controls the electric pump device 11 may always eject air from the first outlet B1 when starting. When receiving a signal to stop and during subsequent stopping, the controller may drive the motor 12 until air is ejected from the fourth (the last in cycle) outlet B4. Such a configuration avoids a situation in which, for example, the actuation is stopped without cleaning a portion of the sensing surface. The sensing surface corresponding to each of the nozzle ports N1 to N4 is evenly cleaned. In the same manner as the embodiment, in one cycle, the air may be ejected in a pattern in which the nozzle ports N1 to N4 are selected once or a different operation (e.g., operation described in a further example described above) may be performed.

In the embodiment, the number of the outlets B1 to B4 is the same as the number of the nozzle ports N1 to N4. Instead, the number of outlets may differ from the number of nozzle ports. A configuration in which the number of outlets is greater than the number of nozzle ports will be described below.

Figure 23:
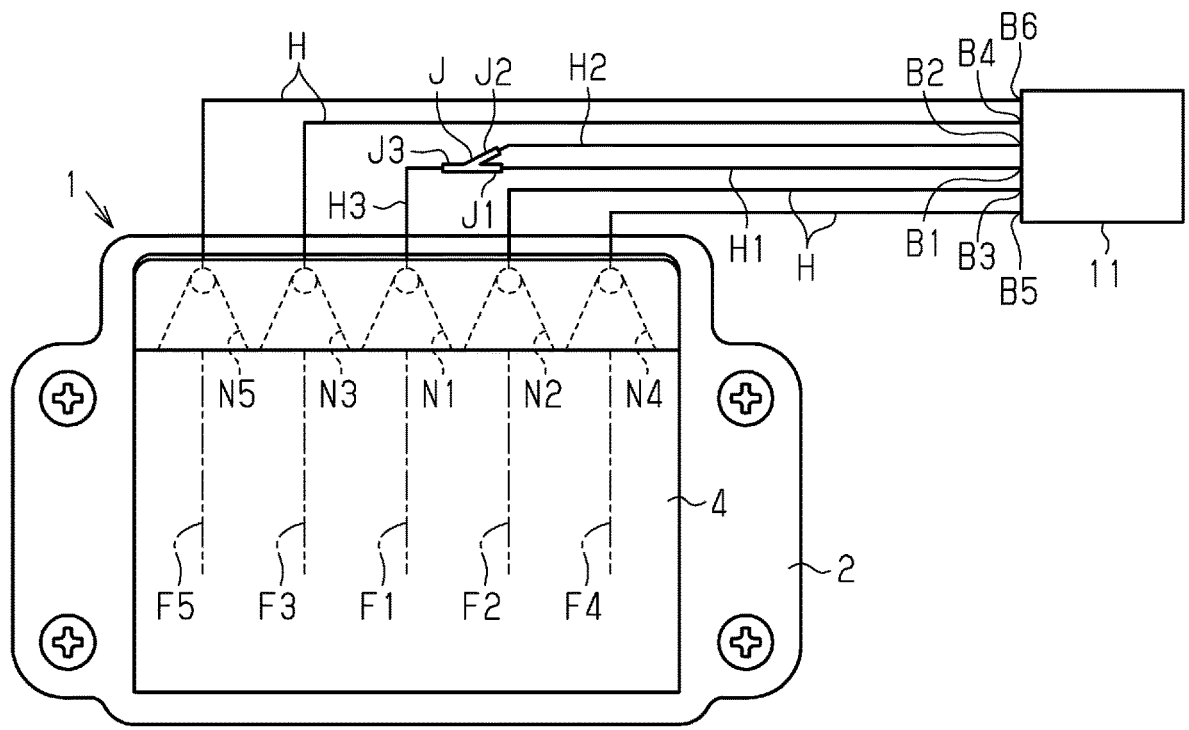
FIG. 23 is a schematic view showing a further example of an on-board sensor cleaning device.
Figure 24:
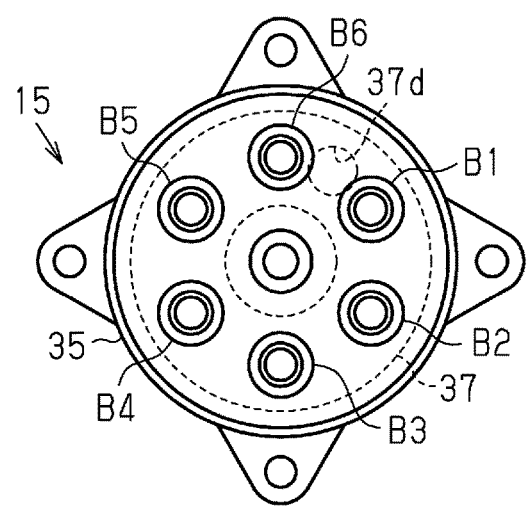
FIG. 24 is a plan view showing a flow passage switch of the example.

As shown in FIGS. 23 and 24, the electric pump device 11 (the flow passage switch 15) includes first to sixth outlets B1 to B6 at equiangular (approximately 60°) intervals and a single communication hole 37d in the rotation switch member 37. More specifically, whenever the rotation switch member 37 is rotated 60°, a different one of the outlets B1 to B6 is sequentially in communication with the single communication hole 37d. That is, the first outlet B1, the second outlet B2, the third outlet B3, the fourth outlet B4, the fifth outlet B5, and the sixth outlet B6 are in communication with the communication hole 37d in this order. FIG. 24 shows a state in which the rotation switch member 37 is being actuated in the circumferential direction so that the communication hole 37d does not overlap with the outlets.

As shown in FIG. 23, the casing 2 includes first to fifth nozzle ports N1 to N5.

Four of the outlets B1 to B6, namely, the outlets B3 to B6, are connected to (in communication with) the nozzle ports N2 to N5 via respective separate hoses H.

Two of the outlets B1 to B6, namely, the outlets B1 and B2, are in communication with the single nozzle N1. More specifically, the outlet B1 is connected to one end of a hose H1, and the outlet B2 is connected to one end of a hose H2 that differs from the hose H1. The other ends of the hoses H1 and H2 connected to the outlets B1 and B2 are connected to first and second connection ports J1 and J2 of a joint member J. The joint member J is a Y-shaped joint member including the first connection port J1, the second connection port J2, and a third connection port J3. The third connection port J3 of the joint member J is connected to one end of a hose H3. The nozzle port N1 is connected to the other end of the hose H3.

With the above configuration, when the electric pump device 11 is driven, after air is ejected twice from the first nozzle port N1, air is ejected once in the order of the second nozzle port N2, the third nozzle port N3, the fourth nozzle port N4, and the fifth nozzle port N5. That is, the air is ejected from the first nozzle port N1, which is located at a central position of the cover glass 4 in the horizontal direction (sideward direction in FIG. 23), more frequently than from the other nozzle ports N2 to N5. Thus, the cleaning focuses on the center of the cover glass 4.

Figure 25:
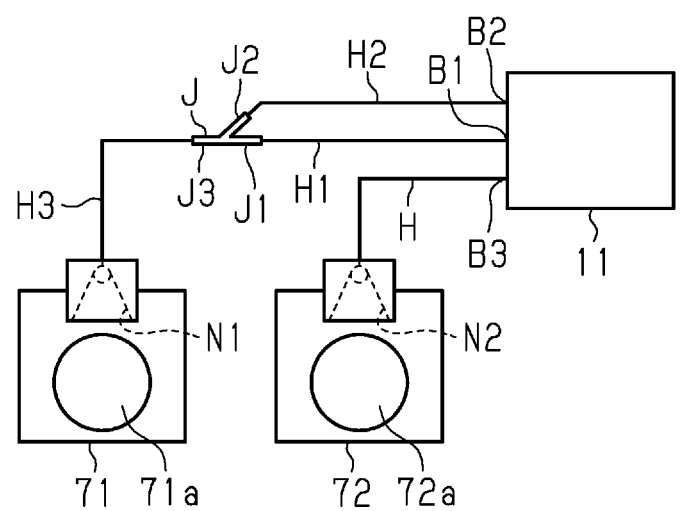
FIG. 25 is a schematic view showing a further example of an on-board sensor cleaning device.

A configuration such as that shown in FIG. 25 may be employed. The configuration shown in FIG. 25 includes, for example, two on-board cameras 71 and 72. The electric pump device 11 includes first to third outlets B1 to B3 (for example, refer to FIG. 19B). One of the outlets B1 to B3, namely, the outlet B3, is connected via a hose H to a nozzle port N2 ejecting air toward a lens 72a, which corresponds to a sensing surface of the on-board camera 72.

Two of the outlets B1 to B3, namely, the outlets B1 and B2, are in communication with a single nozzle port N1 ejecting air toward a lens 71a, which corresponds to a sensing surface of the on-board camera 71. More specifically, one end of the hose H1 is connected to the outlet B1, and one end of the hose H2 is connected to the outlet B2. The other ends of the hoses H1 and H2 connected to the outlets B1 and B2 are connected to the first connection port J1 and the second connection port J2 of the joint member J. The joint member J is a Y-shaped joint member including the first connection port J1, the second connection port J2, and a third connection port J3. The third connection port J3 of the joint member J is connected to one end of a hose H3. The nozzle port N1 corresponding to the lens 71a of the on-board camera 71 is connected to the other end of the hose H3.

When the electric pump device 11 is driven with the above configuration, after air is ejected twice from the nozzle port N1, air is ejected once from the nozzle port N2. That is, air is ejected toward the lens 71a of the on-board camera 71 more frequently than toward the lens 72a of the on-board camera 72. Thus, the cleaning focuses on the lens 71a of the on-board camera 71. As described above, the frequency of air ejection may be changed, for example, in accordance with differences in priority between the on-board cameras 71 and 72 (on-board sensors). The differences in priority between the on-board cameras 71 and 72 may be determined by various factors such as installation positions of the on-board cameras and whether the on-board cameras 71 and 72 are greatly related to traveling of the vehicle. In the present example, the on-board camera 71, for example, constantly captures images of the surroundings of the vehicle (a front camera located on a front portion of the vehicle to capture images of the front of the vehicle or an electronic room mirror camera located on a rear portion of the vehicle to capture images of the rear of the vehicle and transmit the captured images to an electronic room mirror located in the passenger compartment). The on-board camera 71, for example, captures rearward images when the vehicle moves backward (backward movement support camera). As described above, a relative increase in the frequency of air ejection toward the on-board camera 71, which is related to normal traveling, shortens the time that an object is collected on the lens 71a of the on-board camera 71 during normal traveling. This limits deterioration in image capturing of the on-board camera 71.

In the above embodiment and modified examples, fluid is separately ejected from each nozzle, that is, the nozzle ports have different ejection timings. Instead, for example, the ejection timing of at least one of the nozzle ports may differ from the ejection timing of the other nozzle ports. In a specific example, among the nozzle ports N1 to N4, the two nozzle ports N1 and N4 located at opposite sides in the sideward direction may simultaneously eject fluid, and the two nozzle ports N2 and N3 located at a central side may separately eject fluid.

In the embodiment, an on-board camera that is an optical sensor is used as an on-board sensor. However, there is no limit to such a configuration. For example, an optical sensor (such as a lidar-type sensor) that outputs (emits light of) an infrared laser beam and receives scattered light reflected from an object to measure the distance to the object may be used. Alternatively, a radar (e.g., millimeter-wave radar) that uses radio waves or an ultrasonic sensor used as a corner sensor may be used.

As shown in FIGS. 21 and 25, when multiple on-board sensors (on-board cameras in each drawing) are used, the on-board sensors are not limited to the same kind and may be of different kinds. Examples include a combination of lidar and the on-board camera that are described above.

The embodiment and modified examples may be combined in any suitable manner.

The invention claimed is:
1. An on-board sensor cleaning device comprising:
at least three nozzle ports with non-coaxial ejection axes that open toward a single sensing surface of an on-board sensor, the on-board sensor being configured to eject fluid from the at least three nozzle ports in a predetermined order to clean the sensing surface, the predetermined order being a repeating pattern in which each of the at least three nozzle ports is selected one at a time and each of the at least three nozzle ports is selected at least once, and the predetermined order is a sequence that starts from a central position in an arrangement direction of the at least three nozzle portions and alternately switches between a first end side and a second end side in the arrangement direction to eject fluid one by one toward the first end side and the second end side in the arrangement direction.

2. The on-board sensor cleaning device according to claim 1, wherein the at least three nozzle ports are arranged at an upper side of the sensing surface.

3. The on-board sensor cleaning device according to claim 1, wherein:
the at least three nozzle ports are arranged along one side of the sensing surface, and
the pattern is a pattern that proceeds one by one from the first end side toward the second end side in the arrangement direction of the nozzle ports.

4. The on-board sensor cleaning device according to claim 3, wherein the ejection axes of the at least three nozzle ports are inclined toward the second end side in the arrangement direction.

5. The on-board sensor cleaning device according to claim 1, wherein:
- the ejection axis of one of the at least three nozzle ports located at the central position in the arrangement direction is not inclined in the arrangement direction,
- the ejection axis of one of the at least three nozzle ports located at the first end side in the arrangement direction is inclined toward the first end side in the arrangement direction, and
- the ejection axis of one of the at least three nozzle ports located at the second end side is inclined toward the second end side in the arrangement direction.

6. The on-board sensor cleaning device according to claim 1, wherein:
- the sensing surface is one of a plurality of sensing surfaces, and
- the at least three nozzle ports are arranged to clean the plurality of sensing surfaces in a predetermined order.

7. The on-board sensor cleaning device according to claim 1, wherein the pattern is a pattern in which the fluid is ejected multiple times from a predetermined one of the at least three nozzle ports.

8. The on-board sensor cleaning device according to claim 1, further comprising:
- an electric pump including a motor and a pump that discharges fluid from a discharge port with driving force of the motor; and
- a flow passage switch including a plurality of outlets configured to be in communication with the discharge port that respectively switches between each one of the plurality of outlets to be in communication with the discharge port with the driving force of the motor, wherein:
  - the plurality of outlets and the at least three nozzle ports are equal in number, and
  - the plurality of outlets and the at least three nozzle ports are connected to allow movement of fluid.

9. An on-board sensor cleaning device comprising:
- a plurality of nozzle ports configured to eject fluid in a predetermined order to clean a sensing surface of an on-board sensor, the predetermined order repeating a pattern in which the plurality of nozzle ports are selected one at a time, and each of the nozzle ports is selected at least once,
- an electric pump including a motor and a pump that discharges fluid from a discharge port with driving force of the motor; and
- a flow passage switch including a plurality of outlets configured to be in communication with the discharge port that respectively switches between each one of the plurality of outlets to be in communication with the discharge port with the driving force of the motor, wherein:
  - a number of the plurality of outlets is greater than a number of the plurality of nozzle ports, and
  - two or more of the plurality of outlets are connected to a predetermined one of the plurality of nozzle ports.

10. An on-board sensor cleaning device comprising:
a plurality of nozzle ports that are configured to eject fluid in a predetermined order to clean a sensing surface of an on-board sensor, wherein:
- ejection of fluid from all of the plurality of nozzle ports is defined as a cycle, and
- when stopping a cleaning operation, the on-board sensor cleaning device continues actuation until the cycle is completed.

* * * * *